(12) United States Patent
Takizawa et al.

(10) Patent No.: US 7,079,333 B2
(45) Date of Patent: Jul. 18, 2006

(54) LENS DRIVER AND IMAGE CAPTURE APPARATUS

(75) Inventors: Takeshi Takizawa, Kanagawa (JP); Shinichi Orimo, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/725,453

(22) Filed: Dec. 3, 2003

(65) Prior Publication Data

US 2004/0184166 A1 Sep. 23, 2004

(30) Foreign Application Priority Data

Dec. 9, 2002 (JP) .......................... P2002-356371

(51) Int. Cl.
*G02B 7/02* (2006.01)
(52) U.S. Cl. .................. 359/824; 359/823; 359/696
(58) Field of Classification Search ................ 359/822, 359/819, 821, 823, 811, 813, 824, 814, 696
See application file for complete search history.

(56) References Cited

U.S. PATENT DOCUMENTS 5,499,143 A * 3/1996 Sakamoto et al. .......... 359/824
5,905,255 A * 5/1999 Wakabayashi et al. ... 250/201.5
6,400,902 B1 * 6/2002 Usui ............................ 396/55
2003/0184886 A1 * 10/2003 Wakabayashi et al. ...... 359/819

FOREIGN PATENT DOCUMENTS

| JP | 2000-011407 | 1/2000 |
| JP | 2002-023037 | 1/2002 |
| JP | 2002-169073 | 6/2002 |
| JP | 2002-214504 | 7/2002 |

* cited by examiner

*Primary Examiner*—Ricky Mack
*Assistant Examiner*—Brandi Thomas
(74) *Attorney, Agent, or Firm*—Rader, Fishman & Grauer PLLC; Ronald P. Kananen

(57) ABSTRACT

In a lens driver apparatus using a linear actuator, spaces for installing a driving coil and a driving magnet are reduced to contribute to making the lens driver apparatus smaller. The present invention relates to the lens driver apparatus including a body that is to be driven and to which a lens is attached, a guide axis to guide and allow the body to be driven to move freely in a direction of the optical axis, a driving coil being flat-wound and fitted to the body to be driven, and a driving magnet being disposed opposite side of the driving coil and along a direction of movement of the body to be driven. In the lens driver apparatus according to the present invention, the driving coil and the driving magnet are shaped in curved forms so as to conform to an outer shape of the lens.

20 Claims, 6 Drawing Sheets

LENS DRIVER AND IMAGE CAPTURE APPARATUS

CROSS REFERENCES TO RELATED APPLICATIONS

The present invention claims priority to its priority document No. 2002-356371 filed Japanese Laid-Open Publication No. 2000-11407 in the Japanese Patent Office on Dec. 9, 2002, the entire contents of which being incorporated by reference herein.

BACKGROUND OF THE INVENTION

1. Field of the Invention

The present invention relates to a lens driver apparatus and an image capture apparatus that move a lens-holding body to be driven by means of a linear actuator assembly based on a drive coil and a drive magnet.

2. Description of the Related Art

For a conventional actuator of a lens driving mechanism, there is a widely used method utilizing a stepping motor or a DC motor to convert rotary motion of a motor by means of a gear or the like to linear motion so as to shift a zoom lens and a focus lens in a direction of an optical axis. As performance requirements intensify in recent years, there is employed a new technique of a linear drive through a linear actuator combining a plate magnet and a movable coil as disclosed in Patent Document 1.

In Patent Document 2, a technique aiming at improvement of magnetic efficiency and volume efficiency in a driver using a linear actuator as well as its miniaturization is also disclosed. Further, in Japanese Patent Laid-Open Publication No. 2002-214504, there is disclosed a technique of making the point of action of a thrust closer to the center of gravity of a driving section in view of stable motion of the body to be driven.

Furthermore, in Patent Document 3, a driving coil that is wound flat is widely used as a tracking coil that produces a minute movement of an objective employed for an optical disk device and the like.

[Patent Document 1]
Japanese Patent Laid-Open Publication No. 2002-23037
[Patent Document 2]
Japanese Patent Laid-Open Publication No. 2002-169073
[Patent Document 3]
Japanese Patent Laid-Open Publication No. 2000-11407

SUMMARY OF THE PRESENT INVENTION

Although much as a linear actuator used for such a driving mechanism is capable of high-speed and high-precision control, it has problems described as follows. Namely, the first problem is that since the winding direction of the coil is perpendicular to the direction of a lens movement, a part of the coil in which thrust can be generated is limited, thereby causing inferior magnetic efficiency and volume efficiency, and preventing the miniaturization.

The second problem is that use of a linear actuator causes a system to be susceptible to a frictional force generated between a guide axis and a sleeve of the driving section, hence, in a case where there is a large discrepancy between the point of action of thrust generated by the linear actuator and the center of gravity of the driving section, the frictional force varies and makes the stable driving difficult. Thus, a so-called problem of "stick-slip motion" occurs.

The above-mentioned first problem is dealt with by improving magnetic efficiency and volume efficiency and achieving the miniaturization in Patent Document 2, whereas resolution of the second problem has not been accomplished yet. Another problem of this technique is that it is not suited to long-stroke driving such as zooming.

With regard to the second problem, although the technique of making the point of action of thrust move closer to the center of gravity of the driving section is disclosed (for example, see Japanese Patent Laid-Open Publication No. 2002-214504), improvements of the magnetic efficiency and volume efficiency of the linear actuator have not been carried out yet, whereas the use of two inefficient linear actuators for one movable part aggravates efficiency.

Further, there is the third problem. A flat-wound coil is widely used as a tracking coil that produces a minute movement of an objective employed for an optical disk device or the like. However, it is not suited as a driver that requires a long-stroke movement such as zooming operation of a lens tube.

Moreover, as the fourth problem, while a lens tube has been reduced in size year by year, a question now is how small it can be produced. A conventional actuator, when mounting onto the tube, causes a form of the tube's edge protruding, thus standing in the way of making the tube smaller. The protruding edge may be caused by a U-shaped plate of a stepping motor or a magnet and a yoke of a linear actuator.

The present invention is conceived in view of the above-mentioned problems of conventional techniques. According to the present invention, there is provided a lens driver apparatus that comprises a body that is to be driven and to which a lens is attached, a guide axis to guide and allow the body to be driven to move freely in a direction of the optical axis, a driving coil being flat-wound and fitted to the body to be driven, and a driving magnet being disposed opposite side of the driving coil and along a direction of movement of the body to be driven. In the lens driver apparatus according to the present invention, the driving coil and the driving magnet are shaped in curved forms so as to conform to an outer shape of the lens.

In the present invention, for constructing a linear actuator for moving the object that is to be driven and attached to the lens, the driving coil and the driving magnet are shaped in curved forms so as to conform to an outer shape of the lens. Accordingly, the amount of the protrusion from the lens tube employing such a construction may be suppressed, thereby allowing to achieve the miniaturization. Further, according to such a construction, the center of gravity of this construction may be made closer to the center of gravity of the lens, thereby allowing to realize stable movement operation.

As mentioned above, the present invention provides the following effect. Namely, the volume efficiency and the magnetic efficiency of the driving coil are improved, with additional benefits of space saving and miniaturization. Additionally, it is possible to suppress "stick-slide motion" and realize stable driving. Further, the external shape of the lens tube may be designed in a form closer to a cylindrical shape, thus making it possible to increase freedom of design. Moreover, despite the flat-wound linear actuator drive, long-stroke driving is made possible and application may be made to zooming of a lens and the like.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which.

DETAILED DESCRIPTION OF THE PREFERRED EMBODIMENTS

Embodiments according to the present invention will be described with reference to the drawings. Now, a first preferred embodiment will be described. A lens driving mechanism according to the first preferred embodiment is applied to an actuator of a zoom lens at a lens tube of an image capture apparatus such as a video camera.

Figure 1:
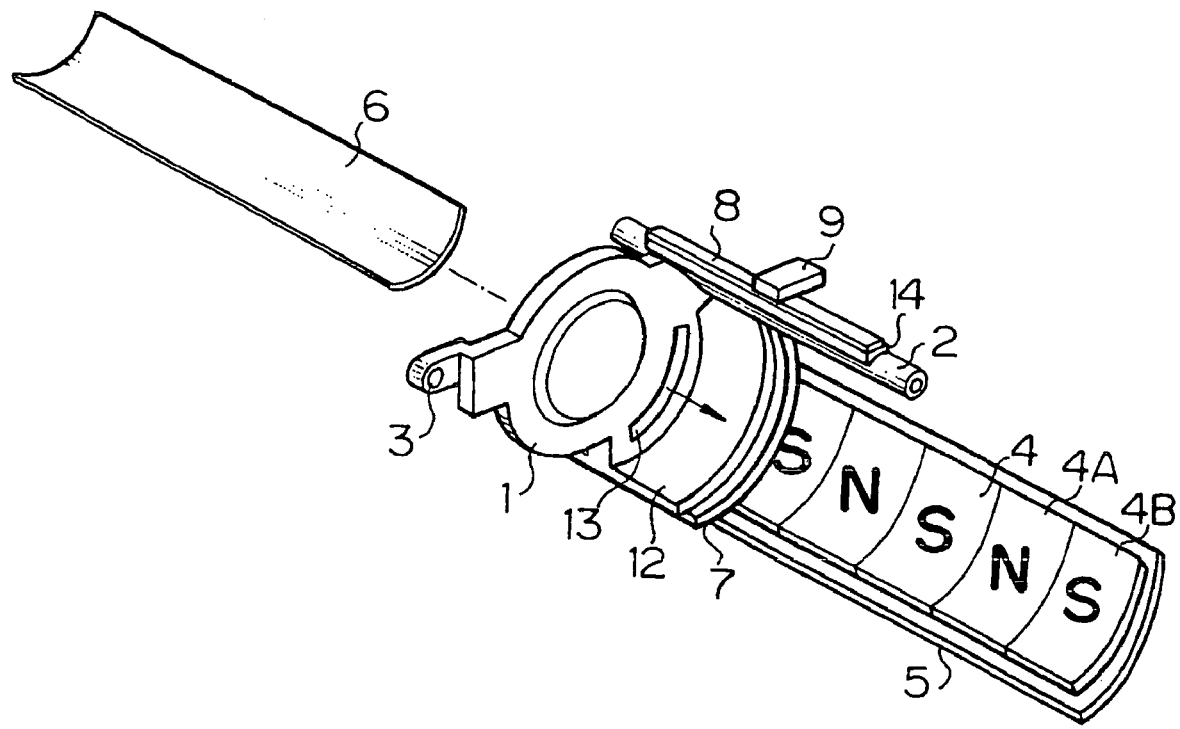
FIG. 1 is a perspective view of an actuator according to a first embodiment.
Figure 2:
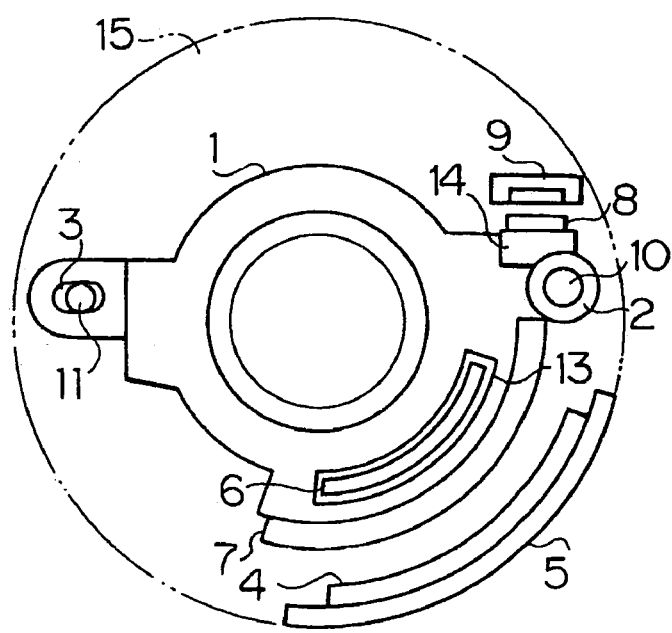
FIG. 2 is a front view of an actuator according to the first embodiment.

FIG. 1 is a perspective view of an actuator according to the first preferred embodiment, and FIG. 2 is a front view of the actuator according to the first preferred embodiment. A body 1 to be driven has a sleeve 2 on one side and a hole 3 on the opposite side of the sleeve 2 while having the optical axis in between, for permitting a guide axis 11 to run therethrough.

The body 1 is prevented from turning around by means of guide axes 10 and 11, which are inserted into the sleeve 2 and the hole 3, so that the optical axis is fixed. Further, by means of the guide axis 10 inserted in the sleeve 2, the guiding is performed without any shake in the direction of movement.

A flat-wound driving coil 7 is attached to the body 1 via a driving coil fitting part 12. Further, the driving coil 7 is provided in a form that is curved along an outer shape of a lens frame of the lens that is attached to the body 1. Still further, the driving coil 7 is disposed at a position nearer to the sleeve 2 side (guide axis 10 side) of the body 1.

Figure 4:
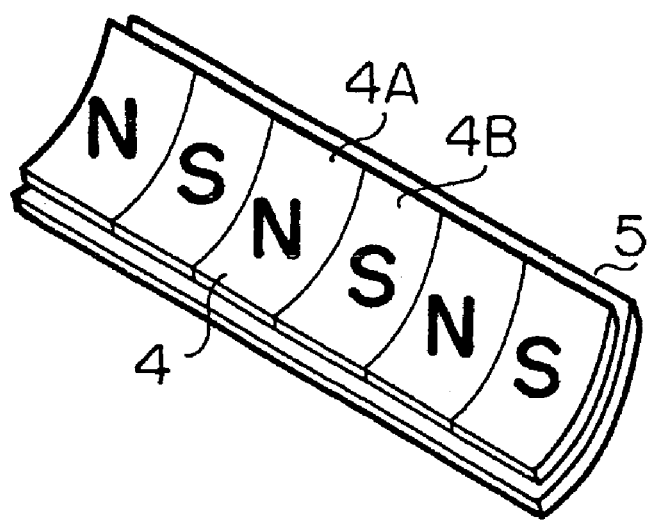
FIG. 4 is a perspective view of a driving magnet.

A driving magnet 4 disposed facing the driving coil 7 is placed in such a manner that a region 4A and a region 4B, which are magnetized inversely from each other, are arrayed alternately adjacent to each other along the direction of movement of the body to be driven. The shape of the driving magnet 4 is curved along a curvature of an inner wall of the lens tube or being curved at substantially the same curvature as a curvature of the lens (see FIG. 4).

Furthermore, a main yoke 5 and an opposite yoke 6 are provided with having the driving coil 7 in between. The opposite yoke 6 goes through a thru-hole 13 formed in the body 1. In the present embodiment, it is adapted to have a sufficient clearance between the opposite yoke 6 and the thru-hole 13 to ensure that the opposite yoke 6 and the thru-hole 13 do not come in contact so as not to interfere the movement as the body 1 moves. The shape of the driving coil 7 is curved along a curvature of an inner wall of the lens tube or being curved at substantially the same curvature as a curvature of the lens.

Figure 3:
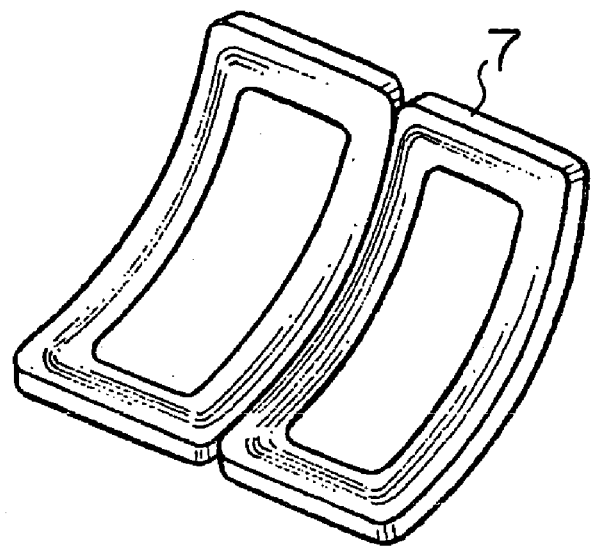
FIG. 3 is a perspective view of a driving coil.

FIG. 3 is a perspective view of the driving coil. The driving coil 7 is flatly wound and shaped along the curvature of the inner wall of the tube or curved at substantially the same curvature as the curvature of the lens. The driving coil 7 generates a driving force to move the body 1 in the direction of the optical axis. Further, the driving coil 7 is a 2-phase coil in which two coils are placed adjacent to each other in a direction parallel to the moving direction of the body 1.

Degrees of the curvature of the above-mentioned driving magnet 4, main yoke 5, opposite yoke 6, and driving coil 7 are set to be the same level or substantially the same.

According to the configuration mentioned above, when a current is run through the driving coil 7, there a thrust parallel to the direction of the optical axis is generated in the driving coil 7 due to a relationship with a magnetic flux flowing through between the opposite yoke 6 and the driving magnet 4 (Fleming's left-hand rule). Accordingly, by means of the driving force, the body 1 moves together with the driving coil 7 in the direction of the optical axis.

A position of the body 1 is detected by an MR (magneto-resistance effect) magnet 8 and an MR sensor 9 for positional detection. The MR magnet R is fitted to a MR magnet fitting part 14 provided on the sleeve 2 of the body 1, and it is alternately magnetized at a predetermined interval.

As shown in FIG. 2, the driving magnet 4 and the driving coil 7 are disposed substantially within a quadrant circumference of the lens. In addition, the main yoke 5, and the opposite yoke 6 are similarly disposed in the same quadrant circumference, freeing nearly three-fourths of the cross-sectional area of the lens driver apparatus for use in mounting other optical devices, such as an iris unit. As shown, the occupied quadrant is from about 90 degrees to 180 degrees for the orientation shown in which the uppermost vertical top of the actuator is at 0 degrees.

The MR sensor 9 is attached to an inner wall (not illustrated) of the lens tube to ensure that it may be set up at a certain interval from the MR magnet 8 within a range of the movement of the MR magnet 8. The MR magnet 8 is so magnetized that the magnetic pole alternately switches along the direction of the movement while the MR sensor 9 is a magneto-resistance effect device whose resistance varies with a change in a magnetic field affecting the sensor.

Accordingly, when the MR magnet 8 moves as the movement of the body 1, the magnetic field affecting the MR sensor 9, which is placed at the opposite side of the MR magnet 8, changes, and then causes changes in the resistance of the MR sensor 9. Accordingly, by counting the changes in the resistance, the position of the body 1 may be accurately detected.

In the present embodiment, the MR sensor 9 and the MR magnet 8 are employed as means of detecting a position of the body 1. Alternatively, any other means for positional detection may be used provided that it is a positional detector of a non-contact type.

In such a lens moving mechanism according to the first preferred embodiment, since the driving coil 7, the driving magnet 4, the main yoke 5 and the opposite yoke 6 are provided in forms that are curved along the outer shape of the lens frame, it is possible to control such assembly to be protruded from the lens tube and achieve the miniaturization.

Another contributing factor is the curved form of the driving lens 7, which is curved along the outer shape of the lens frame. Due to the factor, the center of gravity of the driving coil 7 shifts towards the lens center side. Further, the factor causes the point of action of the thrust of the linear actuator disposed near the sleeve 2 and the center of gravity to be closer to each other, thereby enabling a smooth movement.

Further, as a result of the curved shape of the driving coil 7, the magnetic efficiency and the deposition efficiency are improved more than that of a flat-wound driving coil, thus making it possible to cope with long-stroke driving.

Next, a second preferred embodiment of the present invention will be described. A lens driving mechanism according to the second preferred embodiment is applied to an actuator for a focus lens in a lens tube of a video camera or the like.

Figure 5:
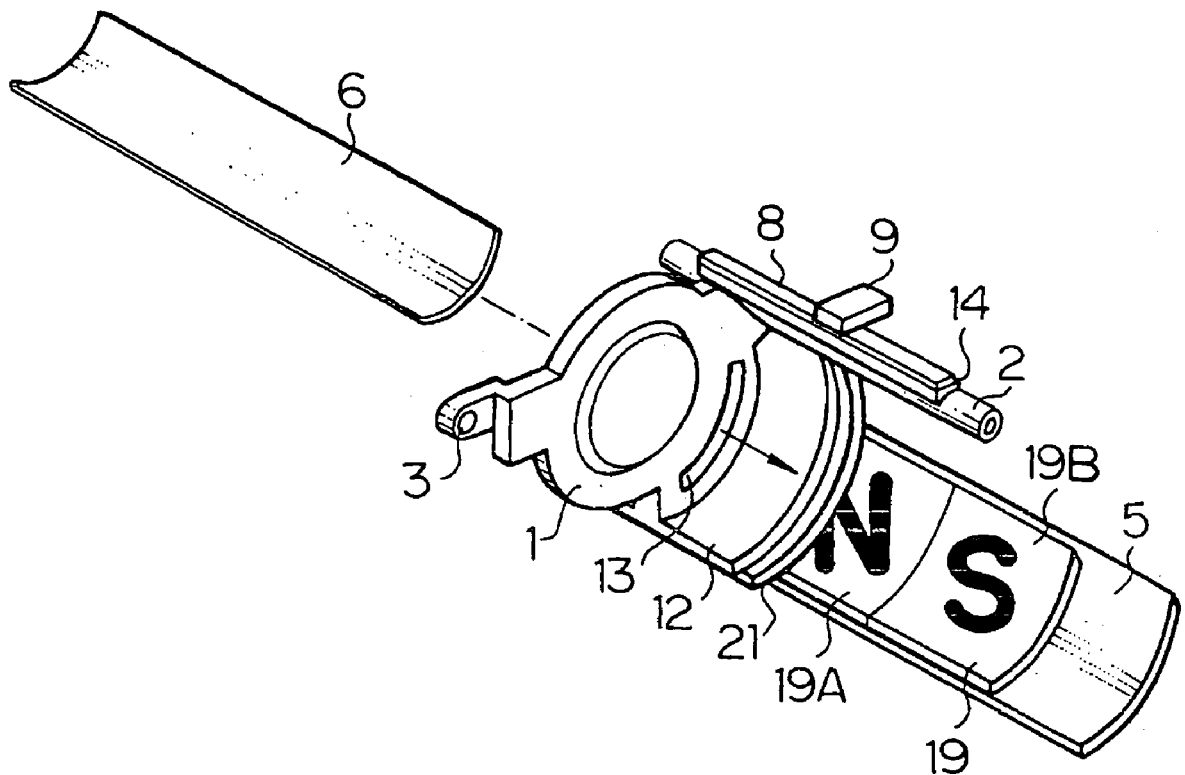
FIG. 5 is a perspective view of an actuator according to a second embodiment.

FIG. 5 is a perspective view of an actuator according to the second preferred embodiment. A body 1 to be driven has a sleeve 2 on one side and a hole 3 on the opposite side while having the optical axis in between, for permiting a guide axis to run therethrough.

The body 1 is prevented from turning around by means of the guide axes, which are inserted into the sleeve 2 and the hole 3, so that the optical axis is fixed. Further, by means of the guide axis 10 inserted in the sleeve 2, the guiding is performed without any shake in the direction of movement.

A flat-wound driving coil 21 is attached to the body 1 via a driving coil fitting part 12. Further, the driving coil 21 is provided in a form that is curved along an outer shape of a lens frame of the lens that is attached to the body 1. Still further, the driving coil 21 is disposed at a position nearer to the sleeve 2 side of the body 1.

Figure 7:
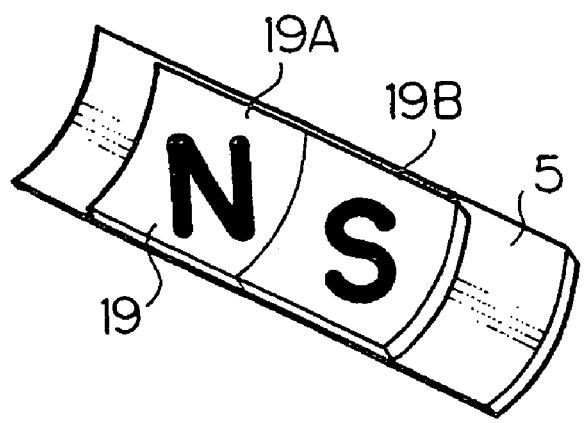
FIG. 7 is a perspective view of a driving magnet according to the second embodiment.

A driving magnet 19 disposed facing the driving coil 21 is placed in such a manner that a region 19A and a region 19B, which are magnetized inversely from each other, are arrayed alternately adjacent to each other along the direction of movement of the body to be driven. The shape of the driving magnet 19 is curved along an inner wall of the lens tube or curved at substantially the same curvature as a curvature of the lens (see FIG. 7).

Furthermore, a main yoke 5 and an opposite yoke 6 are provided with having the driving coil 7 in between. The opposite yoke 6 goes through a thru-hole 13 formed in the body 1. In the present embodiment, it is adapted to have a sufficient clearance between the opposite yoke 6 and the thru-hole 13 to ensure that the opposite yoke 6 and the thru-hole 13 do not come in contact so as not to interfere the movement as the body 1 moves. The shape of the driving coil 7 is curved along a curvature of an inner wall of the lens tube or being curved at substantially the same curvature as a curvature of the lens.

Figure 6:
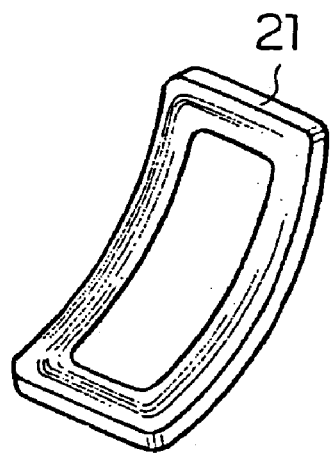
FIG. 6 is a perspective view of a driving coil according to the second embodiment.

FIG. 6 is a perspective view of the driving coil. The driving coil 21 is flatly wound and shaped along the curvature of the inner wall of the tube or curved at substantially the same curvature as the curvature of the lens. The driving coil 21 generates a driving force to move the body 1 in the direction of the optical axis. Further, the driving coil 21 according to the second preferred embodiment is a 1-phase coil.

Degrees of the curvature of the above-mentioned driving magnet 19, main yoke 5, opposite yoke 6, and driving coil 21 are set to be the same level or substantially the same.

According to the configuration mentioned above, when a current is run through the driving coil 21, there a thrust parallel to the direction of the optical axis is generated in the driving coil 21 due to a relationship with a magnetic flux flowing through between the opposite yoke 6 and the driving magnet 19 (Fleming's left-hand rule). Accordingly, by means of the driving force, the body 1 moves together with the driving coil in the direction of the optical axis.

A position of the body 1 is detected by an MR magnet 8 and an MR sensor 9 for positional detection. The MR magnet R is fitted to a MR magnet fitting part 14 provided on the sleeve 2 of the body 1, and it is alternately magnetized at a predetermined interval.

The MR sensor 9 is attached to an inner wall (not illustrated) of the lens tube to ensure that it may be set up at a certain interval from the MR magnet 8 within a range of the movement of the MR magnet 8. The MR magnet 8 is so magnetized that the magnetic pole alternately switches along the direction of the movement while the MR sensor 9 is a magneto-resistance effect device whose resistance varies with a change in a magnetic field affecting the sensor.

Accordingly, when the MR magnet 8 moves as the movement of the body 1, the magnetic field affecting the MR sensor 9, which is placed at the opposite side of the MR magnet 8, changes, and then causes changes in the resistance of the MR sensor 9. Accordingly, by counting the changes in the resistance, the position of the body 1 may be accurately detected.

In the present embodiment, the MR sensor 9 and the MR magnet 8 are employed as means of detecting a position of the body 1. Alternatively, any other means for positional detection may be used provided that it is a positional detector of a non-contact type.

In such a lens moving mechanism according to the second preferred embodiment, in addition to the effects of the lens moving mechanism according to the first preferred embodiment, it is also applicable to a case where the amount of movement is limited to a small value.

Next, a third preferred embodiment of the present invention will be described. A lens driving mechanism according to the third preferred embodiment is applied to an actuator of a zoom lens in a lens tube of a video camera or the like.

Figure 8:
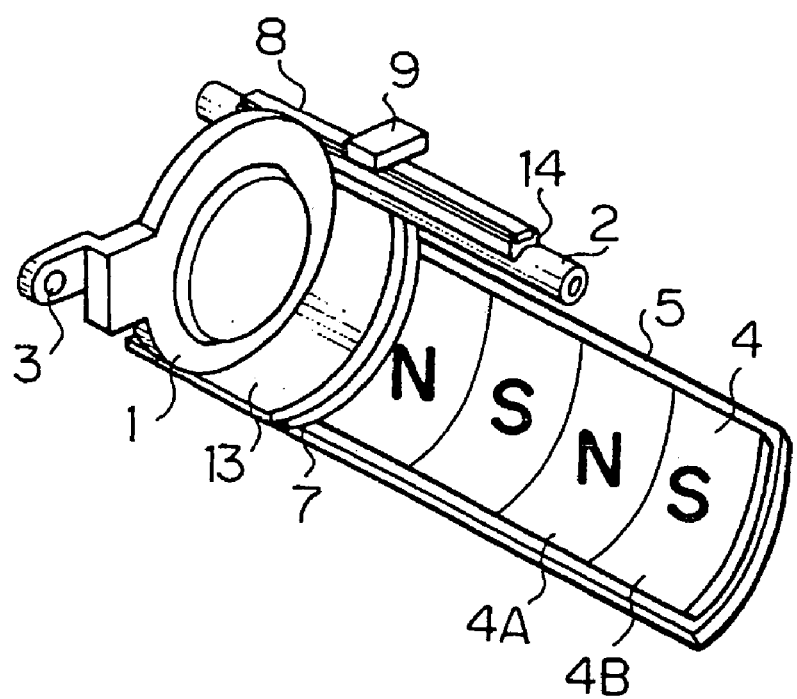
FIG. 8 is a perspective view of an actuator according to the third embodiment.
Figure 9:
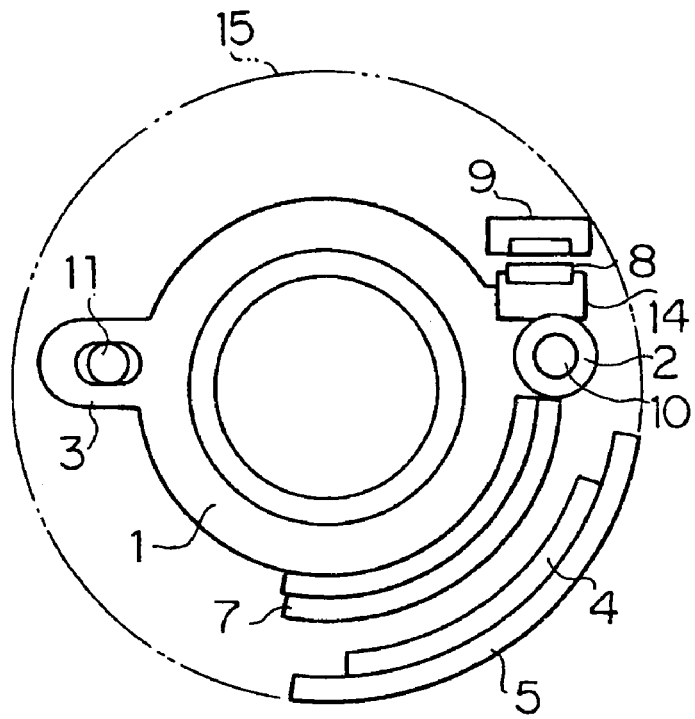
FIG. 9 is a front view of an actuator according to the third embodiment.

FIG. 8 is a perspective view of an actuator according to the third preferred embodiment, and FIG. 9 is a front view of the actuator according to the third preferred embodiment. A body 1 to be driven has a sleeve 2 on one side and a hole 3 on the opposite side of the sleeve 2 while having the optical axis in between, for permitting a guide axis 11 to run therethrough. The body 1 is prevented from turning around by means of guide axes 10 and 11, which are inserted into the sleeve 2 and the hole 3, so that the optical axis is fixed. Further, by means of the guide axis 10 inserted in the sleeve 2, the guiding is performed without any shake in the direction of movement.

A flat-wound driving coil 7 is attached to the body 1 via a driving coil fitting part 12. Further, the driving coil 7 is provided in a form that is curved along an outer shape of a lens frame of the lens that is attached to the body 1. Still further, the driving coil 7 is disposed at a position nearer to the sleeve 2 side of the body 1.

A driving magnet 4 disposed facing the driving coil 7 is placed in such a manner that a region 4A and a region 4B, which are magnetized inversely from each other, are arrayed alternately adjacent to each other along the direction of movement of the body to be driven. The shape of the driving magnet 4 is curved along a curvature of an inner wall of the lens tube or being curved at substantially the same curvature as a curvature of the lens.

In a linear actuator according to the present preferred embodiment, only the main yoke 5 is provided as a yoke along the driving magnet 4. The shape of main yoke 5 is curved along a curved surface of an inner wall of the lens tube or at the same or substantially the same curvature as the curvature of the lens.

The driving coil 7 is flatly wound and shaped along the curvature of the inner wall of the tube or curved at substantially the same curvature as the curvature of the lens. The driving coil 7 generates a driving force to move the body 1 in the direction of the optical axis. Further, the driving coil 7 is a 2-phase coil in which two coils are placed adjacent to each other in a direction parallel to the moving direction of the body 1.

Degrees of the curvature of the above-mentioned driving magnet 4, main yoke 5 and driving coil 7 are set to be the same level or substantially the same.

According to the configuration mentioned above, when a current is run through the driving coil 7, there a thrust parallel to the direction of the optical axis is generated in the driving coil 7 due to a relationship with a magnetic flux generated by the driving magnet 4 (Fleming's left-hand rule). Accordingly, by means of the driving force, the body 1 moves together with the driving coil 7 in the direction of the optical axis.

A position of the body 1 is detected by an MR magnet 8 and an MR sensor 9 for positional detection. The MR magnet R is fitted to a MR magnet fitting part 14 provided on the sleeve 2 of the body 1, and it is alternately magnetized at a predetermined interval.

The MR sensor 9 is attached to an inner wall (not illustrated) of the lens tube to ensure that it may be set up at a certain interval from the MR magnet 8 within a range of the movement of the MR magnet 8. The MR magnet 8 is so magnetized that the magnetic pole alternately switches along the direction of the movement while the MR sensor 9 is a magneto-resistance effect device whose resistance varies with a change in a magnetic field affecting the sensor.

Accordingly, when the MR magnet 8 moves as the movement of the body 1, the magnetic field affecting the MR sensor 9, which is placed at the opposite side of the MR magnet 8, changes, and then causes changes in the resistance of the MR sensor 9. Accordingly, by counting the changes in the resistance, the position of the body 1 may be accurately detected.

In the present embodiment, the MR sensor 9 and the MR magnet 8 are employed as means of detecting a position of the body 1. Alternatively, any other means for positional detection may be used provided that it is a positional detector of a non-contact type.

In such a lens moving mechanism according to the third preferred embodiment, it is possible to realize the effects of the lens moving mechanism according to the first preferred embodiment, which is the miniaturization of the tube and a smooth movement. Further, according to the third preferred embodiment with a construction having only the main yoke 5 as a yoke, it is possible to achieve simplification of the mechanism and further miniaturization.

Next, a third preferred embodiment of the present invention will be described. A lens driving mechanism according to the third preferred embodiment is applied to an actuator for a focus lens in a lens tube of a video camera or the like.

Figure 10:
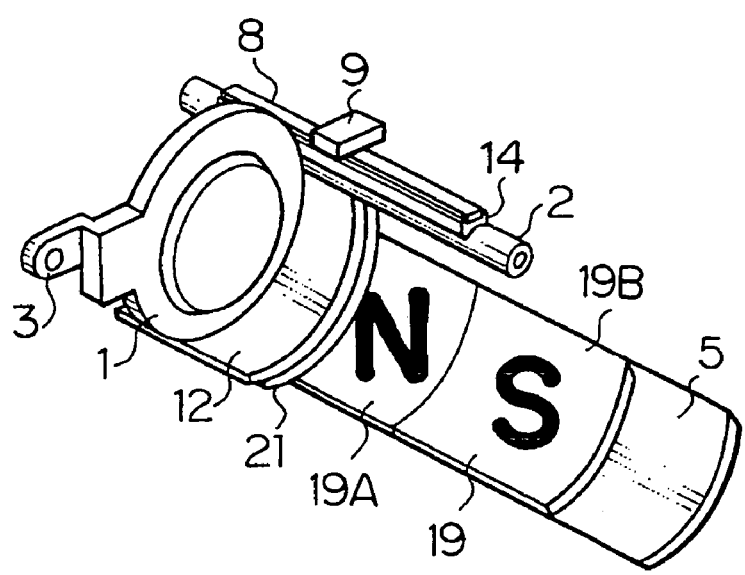
FIG. 10 is a perspective view of an actuator according to a fourth embodiment.

FIG. 10 is a perspective view of an actuator according to the fourth preferred embodiment. A body 1 to be driven has a sleeve 2 on one side and a hole 3 on the opposite side of the sleeve 2 while having the optical axis in between, for permitting a guide axis 11 to run therethrough.

The body 1 is prevented from turning around by means of guide axes, which are inserted into the sleeve 2 and the hole 3, so that the optical axis is fixed. Further, by means of the guide axis inserted in the sleeve 2, the guiding is performed without any shake in the direction of movement.

A flat-wound driving coil 21 is attached to the body 1 via a driving coil fitting part 12. Further, the driving coil 21 is provided in a form that is curved along an outer shape of a lens frame of the lens that is attached to the body 1. Still further, the driving coil 21 is disposed at a position nearer to the sleeve 2 side of the body 1.

A driving magnet 19 disposed facing the driving coil 21 is placed in such a manner that a region 19A and a region 19B, which are magnetized inversely from each other, are arrayed alternately adjacent to each other along the direction of movement of the body to be driven. The shape of the driving magnet 19 is curved along a curvature of an inner wall of the lens tube or being curved at substantially the same curvature as a curvature of the lens.

In a linear actuator according to the present preferred embodiment, only the main yoke 5 is provided as a yoke along the driving magnet 19. The shape of main yoke 5 is curved along a curved surface of an inner wall of the lens tube or at the same or substantially the same curvature as the curvature of the lens.

The driving coil 21 is flatly wound and shaped along the curvature of the inner wall of the tube or curved at substantially the same curvature as the curvature of the lens. The driving coil 21 is a 1-phase coil and generates a driving force to move the body 1 in the direction of the optical axis.

Degrees of the curvature of the above-mentioned driving magnet 19, main yoke 5 and driving coil 21 are set to be the same level or substantially the same.

According to the configuration mentioned above, when a current is run through the driving coil 21, there a thrust parallel to the direction of the optical axis is generated in the driving coil 21 due to a relationship with a magnetic flux generated by the driving magnet 12 (Fleming's left-hand rule). Accordingly, by means of the driving force, the body 1 moves together with the driving coil 21 in the direction of the optical axis.

A position of the body 1 is detected by the MR magnet 8 and the MR sensor 9 for positional detection. The MR magnet R is fitted to the MR magnet fitting part 14 provided on the sleeve 2 of the body 1, and it is alternately magnetized at a predetermined interval.

The MR sensor 9 is attached to an inner wall (not illustrated) of the lens tube to ensure that it may be set up at a certain interval from the MR magnet 8 within a range of the movement of the MR magnet 8. The MR magnet 8 is so magnetized that the magnetic pole alternately switches along the direction of the movement while the MR sensor 9 is a magneto-resistance effect device whose resistance varies with a change in a magnetic field affecting the sensor.

Accordingly, when the MR magnet 8 moves as the movement of the body 1, the magnetic field affecting the MR sensor 9, which is placed at the opposite side of the MR magnet 8, changes, and then causes changes in the resistance of the MR sensor 9. Accordingly, by counting the changes in the resistance, the position of the body 1 may be accurately detected.

In the present embodiment, the MR sensor 9 and the MR magnet 8 are employed as means of detecting a position of the body 1. Alternatively, any other means for positional detection may be used provided that it is a positional detector of a non-contact type.

In such a lens moving mechanism according to the fourth preferred embodiment, in addition to the effects of the lens moving mechanism according to the third preferred embodiment, it is also applicable to a case where the amount of movement is limited to a small value.

Next, a fifth preferred embodiment of the present invention will be described. The fifth preferred embodiment is an example in which an actuator according to the first or third preferred embodiment mentioned above and an actuator according to the second or the fourth preferred embodiment mentioned above are built-in a lens tube.

Figure 11:
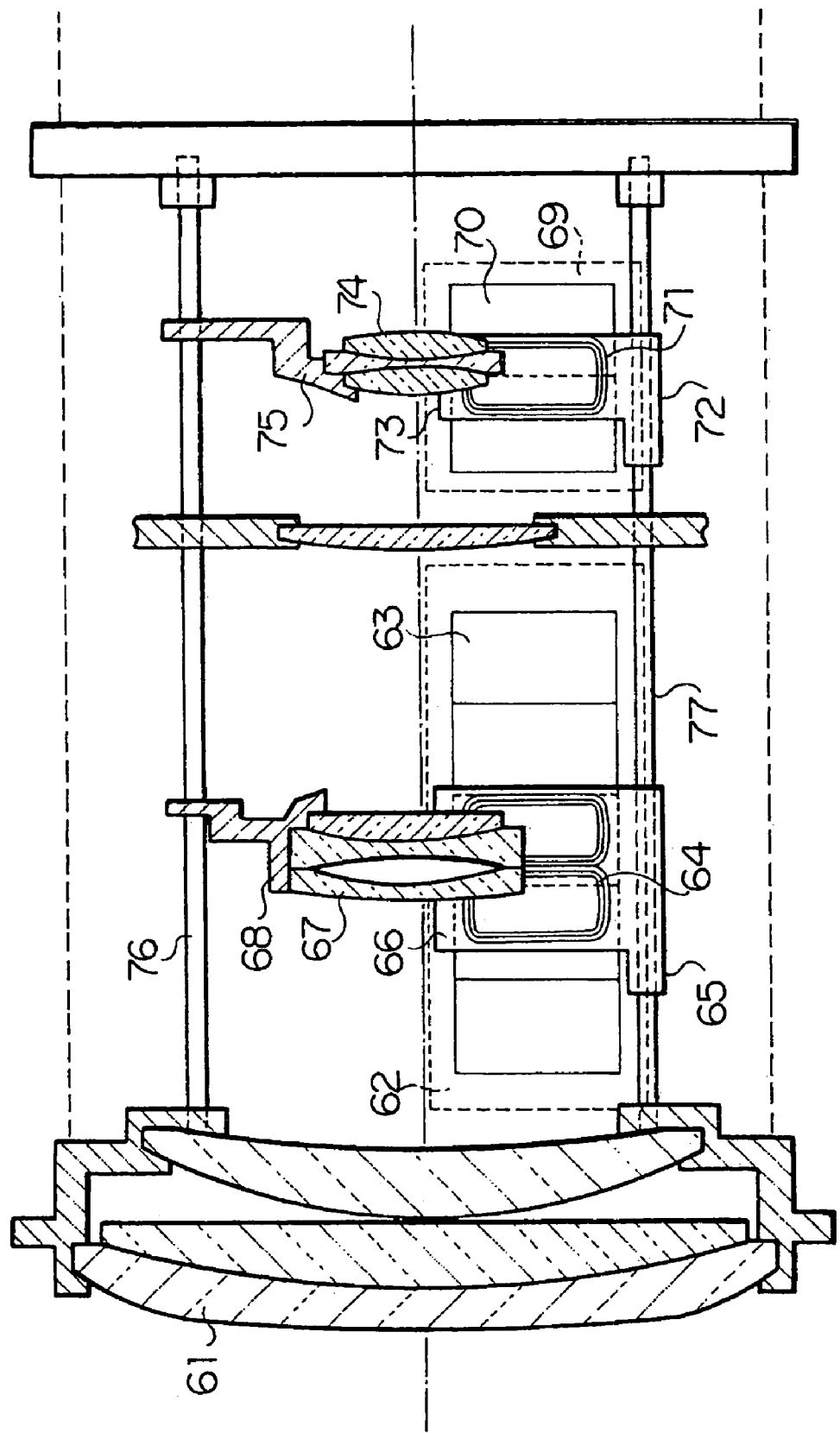
FIG. 11 is a schematic sectional view of a fifth embodiment.

FIG. 11 is a schematic section view of the fifth preferred embodiment. Namely, the above-mentioned lens driving mechanism according to the first or the third preferred embodiment is applied to driving a zoom lens group 67, while the above-mentioned lens driving mechanism according to the second or the fourth preferred embodiment is applied to driving a focus lens group 75.

A front lens group 61 is disposed at the end of an object's side of a lens tube, and in the latter stage thereof the zoom lens group 67 is disposed movably along the optical axis. In the further latter stage thereof, via an intermediate lens, the focus lens group 75 is disposed movably along the optical axis.

Since the zoom lens group 67 has a wider range of the movement and a heavier lens weight than those of the focus lens group 75, the above-mentioned lens driving mechanism according to the first or the third preferred embodiment is applied. On the other hand, since the focus lens group 75 has a narrower range of the movement and a lighter lens weight than those of the zoom lens group 67, the above-mentioned lens driving mechanism according to the second or the fourth preferred embodiment is applied.

The zoom lens group 67 is held by a zoom lens frame 68 to which a flat-wound 2-phase driving coil 64 is attached. In addition, the zoom lens frame has a sleeve 65, and a guide axis 77 runs through a hole of formed in the sleeve 65. Further, on the opposite side of the sleeve 65 of the zoom lens frame 68, a guide axis 76 goes through. By means of these guide axes 76 and 77, the movement of the zoom lens frame 68 is guided along the direction of the optical axis.

Still further, opposite the driving coil 64 attached to the zoom lens frame 68 are disposed a driving magnet 63 and a main yoke 62. The driving coil 64, the driving magnet 63 and the main yoke 62 are, as mentioned above, provided in forms that are curved along the outer shape of the lens frame of the lens.

Furthermore, the focus lens group 74 is held by a focus lens frame 75 to which a flat-wound 1-phase driving coil 71 is attached. In addition, the focus lens frame 75 has a sleeve 72, and a guide axis 77 runs through a hole of the sleeve 72. Further, on the opposite side of the sleeve 72 of the focus lens frame 75, a guide axis 76 goes through. By means of these guide axes 76 and 77, the movement of the focus lens frame 75 is guided along the direction of the optical axis.

Moreover, opposite the driving coil 71 attached to the focus lens frame 75 are disposed a driving magnet 70 and a main yoke 69. The driving coil 71, the driving magnet 70, and the main yoke 69 are, as mentioned above, provided in forms that are curved along the outer shape of the lens frame of the lens.

Through application of such lens moving mechanisms of the zoom lens group 67 and the focus lens group 74, even in the case of a linear actuator, it is possible to bring about miniaturization of a lens tube. Further, a moving mechanism by linear actuator may be realized even where the movement of the zoom lens group 67 covering a wide range of the movement is involved.

It should be noted that all the above-mentioned preferred embodiments are described in terms of construction in which a driving coil is provided in the body 1 with a driving magnet installed at the opposite side, the driving coil moving together with the body 1. Alternatively, the present invention may also be applicable to a different construction in which a driving magnet is provided in the body 1 with a driving coil installed at the opposite side, the driving magnet moving together with the body 1. Because the latter case dispenses with a need of connecting wiring to the body 1, wire-laying work may be facilitated.

It should be understood by those skilled in the art that various modifications, combinations, sub-combinations and alterations may occur depending on design requirements and other factors insofar as they are within the scope of the appended claims or the equivalents thereof.

What is claimed is:

1. A lens driver apparatus comprising:
   a body that is to be driven in a direction of an optical axis of a lens and to which said lens is attached,
   a guide axis for guiding and allowing the body to move freely in said direction of an optical axis of the lens without turning,
   a driving coil that is flatly wound and attached to the body providing a thrust on said body parallel to the direction of the optical axis when a current is provided to said driving coil so that said body moves together with the driving coil in the direction of the optical axis, and
   a driving magnet being disposed opposite side of the driving coil and along a direction of movement of the body,
   wherein the driving coil and the driving magnet are shaped in curved forms so as to conform to an outer shape of the lens; and
   wherein the driving magnet and the driving coil are disposed substantially within only a quadrant circumference of the lens, such that areas substantially corresponding to remaining quadrant circumferences of the lens are free of driving coils for providing thrust to the body in the direction of the optical axis.

2. The lens driver apparatus according to claim 1, further comprising:
   a yoke curved along a shape of the driving magnet.

3. The lens driver apparatus according to claim 1, further comprising:
   a main yoke and an opposite yoke that are disposed so as to face each other with the driving coil in between, and
   the main yoke and the opposite yoke are curved so as to match an outer circumferential shape of the lens.

4. The lens driver apparatus according to claim 1, wherein a plurality of the driving coils are provided and disposed adjacent to one another along the moving direction of the body to be driven.

5. The lens driver apparatus according to claim 1, wherein the driving coil is disposed closer to the guide axis on the outer circumference of the lens.

6. An image capture apparatus comprising:
   a lens driver apparatus according to claim 1, the lens driver apparatus is disposed in a main casing of the image capture apparatus.

7. An image capture apparatus comprising:
   a lens driver apparatus according to claim 2, the lens driver apparatus is disposed in a main casing of the image capture apparatus.

8. An image capture apparatus comprising:
   a lens driver apparatus according to claim 3, the lens driver apparatus is disposed in a main casing of the image capture apparatus.

9. An image capture apparatus comprising:

a lens driver apparatus according to claim 4, the lens driver apparatus is disposed in a main casing of the image capture apparatus.

10. An image capture apparatus comprising:

a lens driver apparatus according to claim 5, the lens driver apparatus is disposed in a main casing of the image capture apparatus.

11. A lens driver apparatus comprising:

a body that is driven along an optical axis of a lens and to which the lens is attached, said body including a sleeve and a member for accommodating a guide axis;

a guide axis for guiding and allowing the body to move freely in a direction of an optical axis of the lens without turning so that said optical axis is fixed and guiding is performed without shake in the direction of movement, a driving coil that is flatly wound and attached to the body via a coil fitting part at a position nearer to the sleeve of the body, providing a thrust to said body so that said body moves together with the driving coil in the direction of said optical axis, and a driving magnet being disposed opposite side of the driving coil and along a direction of movement of the body, wherein the driving coil and the driving magnet are shaped in curved forms so as to conform to an outer shape of the lens about a least a portion of the optical axis and extending therealong; and wherein the driving magnet and the driving coil are disposed substantially within a only quadrant circumference of the lens, such that areas substantially corresponding to remaining Quadrant circumferences of the lens are free of driving coils for providing thrust to the body in the direction of the optical axis.

12. The lens driver apparatus according to claim 11, further comprising:

a yoke curved along a shape of the driving magnet.

13. The lens driver apparatus according to claim 11, further comprising:

a main yoke and an opposite yoke that are disposed so as to face each other with having the driving coil in between, and the main yoke and the opposite yoke are curved so as to match an outer circumferential shape of the lens.

14. The lens driver apparatus according to claim 11, wherein a plurality of the driving coils are provided and disposed adjacent to one another along the moving direction of the body to be driven.

15. The lens driver apparatus according to claim 11, wherein the driving coil is disposed closer to the guide axis on the outer circumference of the lens.

16. An image capture apparatus comprising:

a lens driver apparatus according to claim 1, wherein the lens driver apparatus is disposed in a main casing of the image capture apparatus.

17. A lens driver apparatus comprising:

means for driving a body along an optical axis of a lens and to which the lens is attached, means including a guide axis for guiding and allowing the body to move freely in the direction of an optical axis of the lens without turning, means, including a driving coil that is flatly wound and attached to the body, for providing a thrust to the body for movement in the direction of said optical axis when said coil is energized, and a driving magnet being disposed opposite side of the driving coil and along a direction of movement of the body, wherein the driving coil and the driving magnet are shaped in curved forms that conform to an outer shape of the lens; and wherein the driving coil and the driving magnet are disposed substantially within only a quadrant circumference of the lens, such that areas substantially corresponding to remaining quadrant circumferences of the lens are free of driving coils for providing thrust to the body in the direction of the optical axis.

18. The lens driver apparatus according to claim 17, further comprising:

a yoke curved along a shape of the driving magnet.

19. The lens driver apparatus according to claim 17, further comprising:

a main yoke and an opposite yoke that are disposed so as to face each other with having the driving coil in between, and the main yoke and the opposite yoke are curved so as to match an outer circumferential shape of the lens.

20. The lens driver apparatus according to claim 17, wherein a plurality of the driving coils are provided and disposed adjacent to one another along the moving direction of the body to be driven.

* * * * *

UNITED STATES PATENT AND TRADEMARK OFFICE
CERTIFICATE OF CORRECTION

PATENT NO. : 7,079,333 B2 Page 1 of 1
APPLICATION NO. : 10/725453
DATED : July 18, 2006
INVENTOR(S) : Takeshi Takizawa et al.

It is certified that error appears in the above-identified patent and that said Letters Patent is hereby corrected as shown below:

Column 10:
Line 56, Claim 6 "the lens" should read -- wherein the lens --.
Line 60, Claim 7 "the lens" should read -- wherein the lens --.
Line 64, Claim 8 "the lens" should read -- wherein the lens --.

Column 11:
Line 2, Claim 9 "the lens" should read -- wherein the lens --.
Line 6, Claim 10 "the lens" should read -- wherein the lens --.
Line 28, Claim 11 "a least" should read -- at least --.
Line 31, Claim 11 "a only" should read -- a --.

Signed and Sealed this

Ninth Day of January, 2007

JON W. DUDAS
*Director of the United States Patent and Trademark Office*